United States Patent

Haghgooie et al.

[11] Patent Number: 5,477,822
[45] Date of Patent: Dec. 26, 1995

[54] SPARK IGNITION ENGINE WITH CYLINDER HEAD COMBUSTION CHAMBER

[75] Inventors: Mohammad Haghgooie, Ann Arbor; Rodney J. Tabaczynski, Northville, both of Mich.

[73] Assignee: Ford Motor Company, Dearborn, Mich.

[21] Appl. No.: 271,201

[22] Filed: Jun. 27, 1994

[51] Int. Cl.⁶ .................................................. F02B 19/18
[52] U.S. Cl. .................................................. 123/286
[58] Field of Search .................................. 123/263, 286, 123/261, 258, 292

[56] References Cited

U.S. PATENT DOCUMENTS

| | | | |
|---|---|---|---|
| 3,911,878 | 10/1975 | Hofbauer et al. | 123/292 |
| 4,058,090 | 11/1977 | Suzuki et al. | 123/275 |
| 4,248,192 | 2/1981 | Lampard | 123/256 |
| 4,372,264 | 2/1983 | Trucco | 123/255 |
| 4,401,072 | 8/1983 | Ito et al. | 123/292 |
| 4,406,260 | 8/1983 | Burley | 123/258 |
| 4,424,780 | 1/1984 | Trucco | 123/255 |
| 4,465,032 | 8/1984 | Artman | 123/263 |
| 4,467,759 | 8/1984 | Artman | 123/263 |
| 4,483,289 | 11/1984 | Paul et al. | 123/263 |
| 4,483,291 | 11/1984 | Artman | 123/286 |
| 4,545,344 | 10/1985 | Matuo | 123/286 |
| 4,846,125 | 7/1989 | Hereyama et al. | 123/292 |
| 5,009,207 | 4/1991 | Merritt | 123/261 |
| 5,054,443 | 10/1991 | Kawamura | 123/254 |
| 5,178,109 | 1/1993 | Kawamura | 123/292 |

Primary Examiner—Raymond A. Nelli
Attorney, Agent, or Firm—Jerome R. Drouillard; Roger L. May

[57] ABSTRACT

An engine is provided with a combustion chamber that is separate from the main cylinder displacement/swept volume area and mounted in a cavity in the cylinder head and having a connection between the two by a channel of small cross-sectional area providing high velocity flow of fresh air from the cylinder into the combustion chamber to aid in fuel evaporation and fuel-air mixing, thereby providing complete combustion wholly within the separate chamber. Only intake air is taken into the engine during the intake stroke. A separate valve is provided at the exit of the combustion chamber to the connecting channel for cold start operation, the valve remaining closed until the ratio between the pressures in the cylinder under compression and in the combustion chamber exceeds two, i.e., establishing sonic flow in the channel, whereby a rush of fresh air into the combustion chamber upon opening of the valve and injection of fuel and ignition thereof causes complete combustion wholly within the combustion chamber. The pockets of fresh air stored in the main cylinder dilute the burned gas during the expansion stroke of the piston in response to the intense vortex flow out of the combustion chamber to the main chamber therefor promoting post oxidation of any unburned hydrocarbons.

12 Claims, 2 Drawing Sheets

INTAKE

COMPRESSION

EXPANSION

EXHAUST

SPARK IGNITION ENGINE WITH CYLINDER HEAD COMBUSTION CHAMBER

FIELD OF THE INVENTION

This invention relates in general to automotive type spark ignited engines, and, more particularly, one in which the combustion chamber is separate from the engine main cylinder chamber.

BACKGROUND OF THE INVENTION

The present-day stringent emission standards for motor vehicles dictate a closer look to feedgas emission reduction. Major sources of hydrocarbon (HC) emission with respect to the conventional combustion chamber construction are cold start, fuel inhomogeneities, crevice volumes inside the combustion chamber, wall wetting, and quality of combustion.

The contribution of cold start to HC emissions stems from the difficulty of fuel evaporation and the forming of a combustible mixture. The normal wall wetting and puddling of the liquid fuel in the intake port and on the intake valve, and even on the piston top make it difficult to develop a robust control strategy for cranking and startup of the engine.

In the construction to be described, sonic air flow through a valve is used to aid fuel evaporation and air/fuel mixing. The effect of crevice volume loading with unburned hydrocarbons is essentially eliminated by keeping the fuel away from the crevices. And, finally, the combustion quality is enhanced by controlling the fluid dynamics inside the combustion chamber by means of piston motion and proper combustion chamber design.

It is well understood that the motion of the fluid at the time of spark ignition plays a dominant role in providing good engine combustion. Normally this flow motion is generated in the intake process which requires a careful design of the intake runner, intake port, and intake valve and cylinder head interface. Nevertheless, a large percentage of the intake generated flow may decay by the time of ignition.

To generate a required flow field at the time of ignition, the combustion chamber in this case is moved from its conventional location, either in the piston top or between the cylinder head and piston, to a cavity inside the cylinder head, as indicated in the drawings. The combustion chamber and main cylinder displacement/swept volume chamber now communicate through an appropriately designed small connecting channel with a valve at the exit of the chamber and entrance to the channel. Using the piston motion and the smallness of the connecting channel, an intense flow field inside the combustion chamber can be generated at the time of spark ignition to not only vaporize the fuel, but provide excellent mixing of the air and fuel to assure combustion wholly within the combustion chamber. To accomplish this, the spark plug and fuel injector both would be located in the combustion chamber wall.

DESCRIPTION OF THE PRIOR ART

The use of a combustion chamber located in the cylinder head is known, especially as pre-combustion chambers for diesel engines. For spark ignition engines, the construction generally is complicated, often requiring the use of multiple spark plugs and/or fuel injectors, providing combustion in more than one chamber, or not providing complete combustion in the cylinder head chamber alone.

U.S. Pat. No. 4,248,192 Lampard, shows an engine having a small main swirl type combustion chamber 36 and a pilot air/fuel igniting chamber 40 both in the cylinder head, and both with a fuel injector 74,70. Chamber 36 is connected to the cylinder clearance volume area by a passage 34 that is open at all times. The pilot chamber 40 has a spark plug 72 as well as a valve 42 to control the flame flow from chamber 40 into chamber 36, when valve 42 is opened. The construction requires two separate combustion chambers, and two injectors per cylinder. Valve 42 is always reciprocably operated, and not just for a cold start operation. Lampard also states that the main cylinder interior may form a third combustion chamber.

U.S. Pat. No. 3,911,878 Hofbauer et al, shows an engine with a combustion chamber 17 separated from the main cylinder volume and having a fuel injector 21 and a spark ignitor 22. The chamber is connected to the main cylinder swept volume area through conduits 18,19 past a switching valve 12 and a transit valve 10 that operates to close the connecting passage to the main cylinder interior. The combustion chamber in this case, however, burns the air/fuel mixture in a continuous combustion process by means of a permanently burning flame. The spark plug 22 is used only to start the process within chamber 17.

U.S. Pat. No. 4,058,090 Suzuki et al, shows a pre-combustion chamber 8 and a main combustion chamber 1 that provides secondary combustion by means of the flame of the burning air/fuel mixture in pre-chamber 8 spreading throughout the main combustion chamber 1 to sustain the secondary combustion.

SUMMARY OF THE INVENTION

An engine construction is provided in which the sole combustion chamber is located in the cylinder head separated from the main cylinder chamber but connected to it by a flow channel of small cross-sectional area. The combustion chamber contains a fuel injector and a spark ignitor/plug. High velocity fresh air pushed from the main cylinder swept volume area into the combustion chamber during the piston compression stroke evaporates the fuel in the chamber while effecting a swirling motion to mix the air and fuel in a manner to provide complete combustion entirely within the combustion chamber. Only fresh air is drawn into the main cylinder area during the intake stroke.

For cold starts, a valve located at the combustion chamber end of the connecting channel is closed until the ratio of the main cylinder compression pressure to the combustion chamber pressure is high enough to effect sonic flow through the connecting channel upon opening of the valve to evaporate the fuel and mix the air and fuel to provide complete combustion.

It is, therefore, a primary object of the invention to provide a method of operation and construction of a spark ignited engine with superior fuel evaporation and air/fuel mixing accomplished by locating the single combustion chamber in the cylinder head separate from the main cylinder swept volume area and connected thereto only by a small channel that promotes the rapid flow of fresh air from the main cylinder area into the combustion chamber during the piston compression stroke to fully evaporate the fuel and mix it with the incoming air to provide complete combustion and wholly contained within the combustion chamber.

Other objects, features and advantages of the invention will become more apparent upon reference to the succeeding, detailed description thereof, and to the drawings illustrating the preferred embodiment thereof.

BRIEF DESCRIPTION OF THE DRAWINGS

The drawings illustrate schematically in FIGS. 1–4 the four cycles of engine operation, i.e., FIG. 1, intake, FIG. 2, compression, FIG. 3, expansion, and FIG. 4, exhaust, of an engine embodying the invention.

DESCRIPTION OF THE PREFERRED EMBODIMENT

Figure 1:
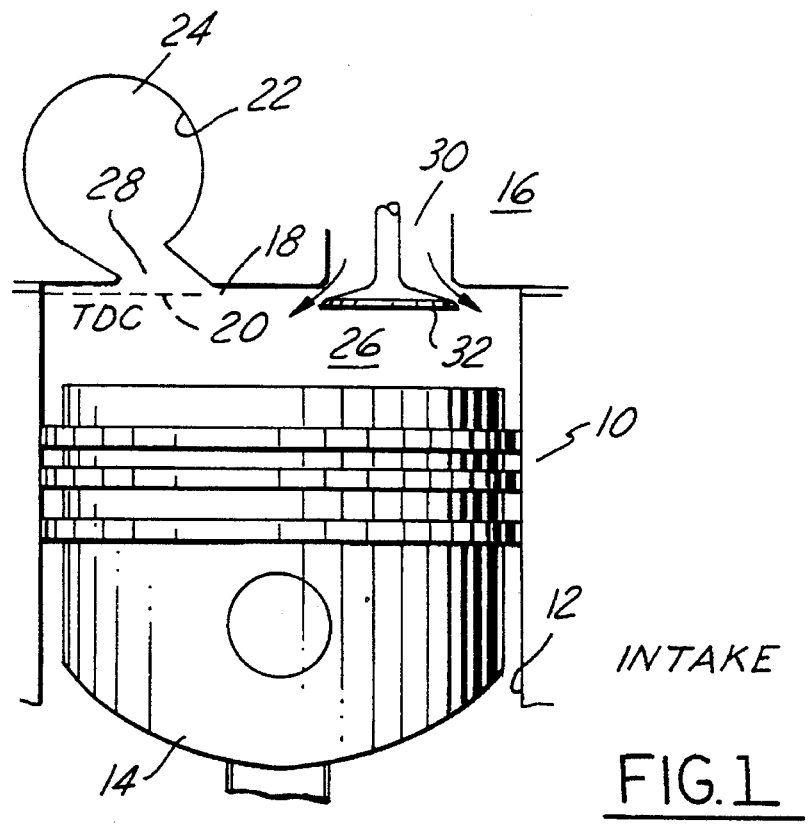

FIG. 1 is a schematic showing, for purposes of illustration, a portion of a four cycle internal combustion engine during the downward intake stroke. It has a cylinder block 10 within which is located the usual cylinder bore 12 that reciprocably receives therein a conventional piston 14. A cylinder head indicated at 16 overlies and covers the cylinder bore to define a clearance volume 18 between the head and the top dead center (TDC) position of the piston 14, indicated by dotted line 20.

Cylinder head 16 contains cavity 22, consisting in this case of spherically shaped combustion chamber 24. The latter is separated from the main cylinder displacement/swept volume area/chamber 26, as indicated, but connected thereto by a communicating flow channel 28 of small cross-sectional area. Also provided in the cylinder head is a fresh air inlet passage indicated partially at 30 closed by a movable intake valve 32.

Figure 2:
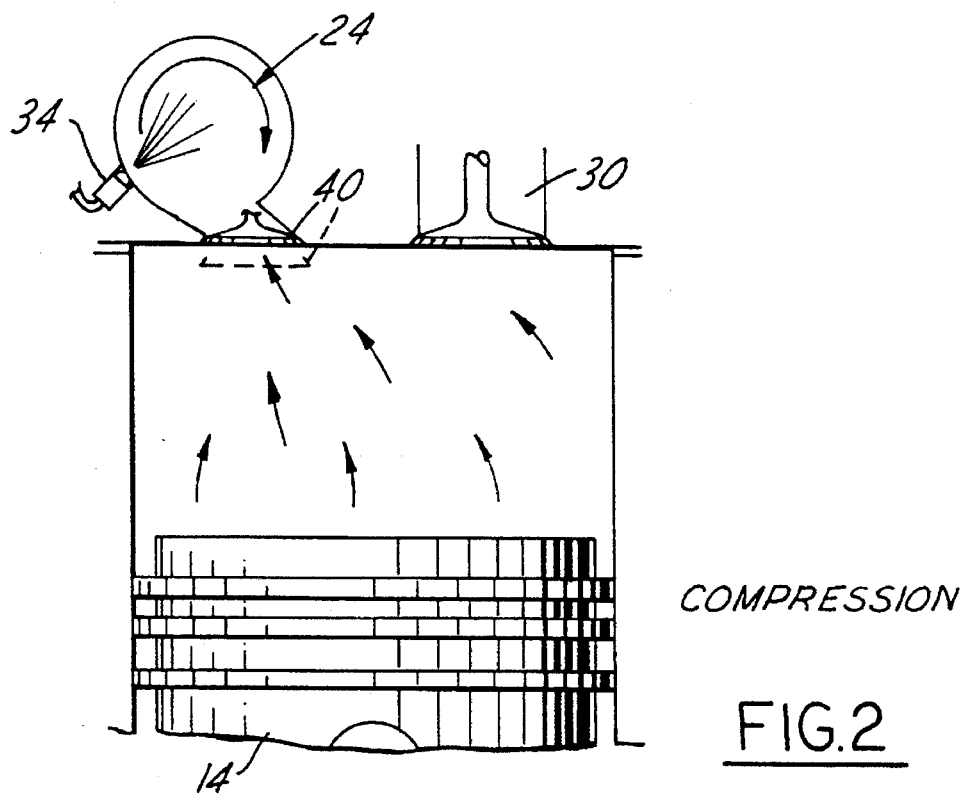
Figure 3:
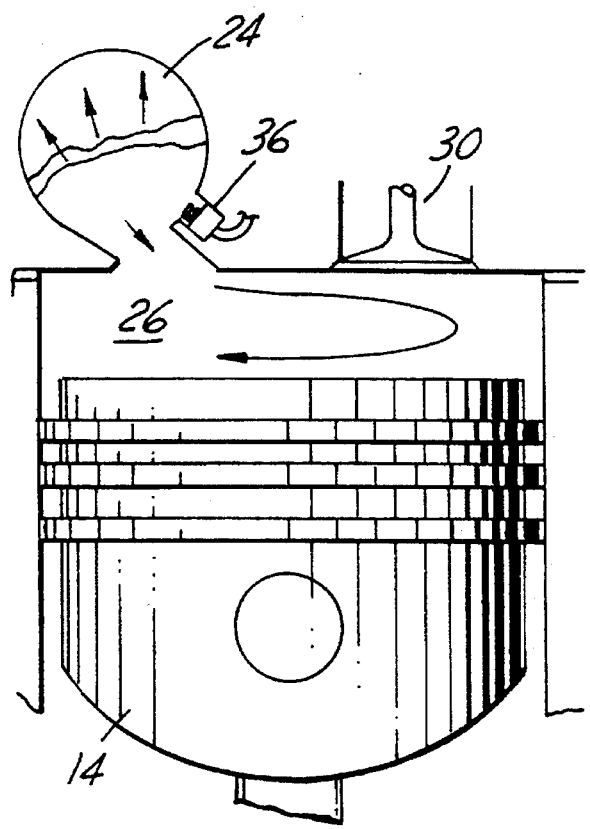

As indicated more specifically in FIGS. 2 and 3, illustrating the upward compression and downward expansion strokes of the piston, the combustion chamber 24 includes a fuel injector 34 located on the wall of the chamber, as is a spark ignitor/plug 36 located near the exit of the chamber adjacent the connection to channel 28. The fuel is injected in a direction into the chamber away from the entrance neck portion. Likewise, the spark plug is angled towards the rear of the chamber to aid in trapping and pushing the air/fuel mixture within the chamber, as indicated more clearly in FIG. 3.

FIG. 2 further shows a cold start valve 40 at the junction between combustion chamber 24 and connecting channel 28. The valve normally is open at all times with a warmed up engine, providing unrestricted communication between the chamber and the main cylinder chamber, but is closed for cold start operation. This will be explained more fully later.

Figure 4:
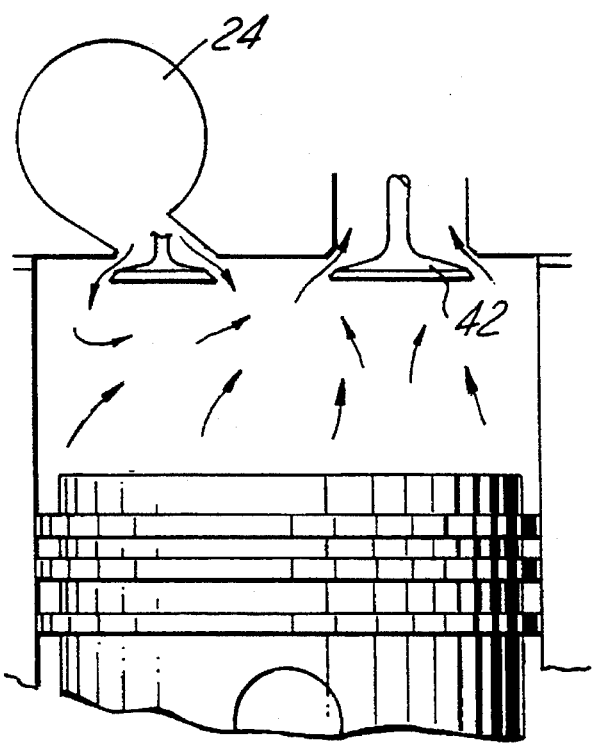

Completing the construction, FIG. 4, illustrating the upward exhaust stroke of the piston, shows the cylinder head having an exhaust valve 42 that is normally closed in a conventional manner except during the exhaust event to discharge the products of combustion from the cylinder.

Referring to FIG. 1, the intake port portion of passage 30 is designed for maximum flow coefficient without regard to in-cylinder flow generation. This will simplify the port design and reduce engine pumping losses. During the downward intake stroke, fresh air will enter through intake passage 30 past the open valve 32 into the main cylinder swept volume chamber 26.

For cold start operation, cold start valve 40 will be closed and remain so until sometime after the start of compression. At that time, intake valve 32 will close. When the pressure ratio between the displacement/swept volume in cylinder chamber 26 and the combustion chamber 24 exceeds two, a sonic flow condition is created in channel 28. Fuel will be injected into combustion chamber 24 onto the walls, as indicated in FIG. 2, and valve 40 will be opened. It will be clear that the timing between fuel injection and cold start valve opening and ignition would be synchronized for the best fuel evaporation. The opening of valve 40 will cause a rush of the fresh air at sonic velocity from the main chamber through connecting channel 28 into the combustion chamber 24, thus producing a multi-directional swirling fluid motion that will promote fuel evaporation and fuel-air mixing to provide complete combustion wholly within combustion chamber 24. The mixture then is ignited.

With proper combustion chamber and channel design, a high degree of swirl, tumble, or any other useful fluid motion can be achieved. The thermal energy stored in the hot combustion chamber walls will be consumed to vaporize liquid fuel and thus lower the wall temperature. Vaporized fuel and the swirling air flow pattern will enhance the air/fuel mixing and lead to fast combustion.

The fast combustion and lower combustion chamber wall temperature can reduce knock tendency. A slight pumping loss due to limited size of the connecting channel 28 may occur. However, this loss will be no more than the intake port/valve loss of a conventional engine which produces a similar flow field in the conventional combustion chamber.

During warm engine operation, cold start valve 40 will be open at all times since the hot combustion chamber walls and the swirling/tumbling flow through the connecting channel 28 will be adequate for fuel evaporation and mixing.

The fuel will be totally confined to the combustion chamber 24, thus its storage in the piston ring pack and other crevices in the cylinder will be diminished and its absorption in the cylinder wall oil layer will be eliminated. This will drastically reduce HC emissions. Also, because the fuel injection is confined to the combustion chamber, unlike port injected engines, there will be no deposit formation in the intake ports and or the intake valves.

Since the injection is performed in the early stages of the compression stroke, a modified port fuel type injection system may be adequate for fueling the combustion chamber.

As indicated previously, the spark plug is located at the combustion chamber end of the connecting channel 28. With the angulation of the spark plug toward the rear of the chamber, as indicated, the flame will propagate away (FIG. 3) from the cylinder displacement volume area and the unburned mixture will be confined to the combustion chamber. The end gases will be pushed away from the piston rings and head crevices, thus again reducing HC emissions.

Flame stretching due to the fluid motion through the channel 28 into chamber 24 will enhance the initial kernel development and overall combustion. With a high swirling motion in the combustion chamber, the hot residual gases will be forced into the center of the chamber. With the spark plug at the periphery, the effect of the residual gases on the kernel development will be minimized. Therefore, more stable engine idling can be expected. Short burn duration will reduce the knock tendency of the engine. Therefore, the compression ratio could be increased for further benefits in fuel economy.

Pockets of fresh air can be stored in the main cylinder for use during the expansion process. Therefore, during the expansion stroke, the intense vortex flow out from the combustion chamber, as indicated in FIG. 4, to the main cylinder will entrain the fresh air and assist in mixing any unburned hydrocarbons, carbon monoxides and the residual gas and the stored fresh air, therefore promoting post-oxidation.

Because combustion occurs only in the isolated chamber 24, coating the surfaces of the main cylinder's displacement volume area with low thermal diffusivity material will reduce heat loss to the coolant. This will adequately compensate for the increased surface-to-volume ratio of this construction.

From the foregoing, it will be seen that the invention provides an engine that provides superior fuel evaporation and air/fuel mixing by means of sonic air flow into the combustion chamber during cold starts and a high velocity flow during warm engine operations. This is accomplished by use of a combustion chamber located in the cylinder head separated from the main cylinder displacement volume but connected to it by a channel of small cross-sectional area promoting high velocity air flow. Heat from the chamber walls and swirl enhances the evaporation of the fuel and mixing throughout the operation. Since only fresh air is drawn into the cylinder during the intake stroke, low HC emissions and fast combustion results. Complete combustion is obtained in the separate combustion chamber. Therefore, wall wetting, piston ring loading, and cylinder wall oil layer absorption will be eliminated to drastically reduce HC emissions.

While the invention has been shown and described in its preferred embodiment, it will be clear to those skilled in the arts to which it pertains, that many changes and modifications may be made thereto without departing from the scope of the invention. Implementation of a variable compression ratio into this concept could easily be made by changing the volume of the separate combustion chamber by an external piston, for example. This could be used to improve idle quality, fuel economy and control of in-cylinder peak pressure. Also, it will be clear that while a spherical combustion chamber design is shown, the cavity could be cylindrical, or any other shape that will enhance combustion and improve engine operation.

We claim:

1. A spark ignition type engine including an engine block having at least one cylinder bore therein, a piston mounted for a reciprocatory motion therein, a cylinder head overlying and closing the cylinder bore to together with the bore walls and piston define a small annular clearance volume area between the top of the piston and the cylinder head at the top dead position of the piston and a swept volume area therebetween during the reciprocatory movement of the piston, the head having an air inlet opening into the space between the piston and head, an air inlet valve movable between a closed position shutting the inlet opening and an open position admitting air to the cylinder swept area, and a cavity in the cylinder head defining the sole combustion chamber for said cylinder and connected to the clearance/swept volume area by a single channel of limited cross-sectional area therebetween, the chamber containing fuel injection means and spark ignition means operable in timed relationship with the movement and location of the piston relative to the head during the engine compression stroke forcing fresh air into the chamber to ignite and completely burn the air/fuel mixture totally within the confines of the combustion chamber thereby eliminating the passage of unburned fuel into the swept volume area space.

2. An engine as in claim 1, the connecting channel limited area in cooperation with the compression pressures in the swept volume space inducing a high degree of swirl in the combustion chamber and a tumbling of the air/fuel mixture therein to evaporate the fuel and mix the air and fuel for complete combustion wholly within the chamber.

3. An engine as in claim 1, including a combustion chamber cold start valve movable between open and closed positions adjacent the connection of the latter chamber to the connecting channel for closing the latter channel during an engine cold start operation until the attainment of a predetermined pressure ratio between the prevailing pressures in the combustion chamber and in the swept volume area providing flow conditions through the passage suitable to enhance fuel evaporation and mixing of the air and fuel to the desired cold start air/fuel ratio.

4. An engine as in claim 3, the cold start valve remaining open at all times other than during cold start operations.

5. An engine as in claim 3, wherein sonic flow conditions are effected when the pressure ratio between the swept volume area and combustion chamber exceeds two.

6. An engine as in claim 1, wherein the ignition means is located in the combustion chamber adjacent the connection to the connecting channel and angled to a position whereby fuel ignited thereby propagates the flame away from the connection further into the combustion chamber to confine the mixture to the combustion chamber thereby minimizing the exhaust of undesirable emissions.

7. An engine as in claim 6, wherein the presence of fresh air in the cylinder during the engine expansion stroke mixing with the fluid emitted from the combustion chamber promotes oxidation of any unburned hydrocarbons and carbon monoxides and other undesirable emissions.

8. A spark ignition type engine having a block and a cylinder head covering the block, the block containing at least one cylinder bore with a piston slidable reciprocably therein to define a variable displacement volume area between the head and piston upon reciprocatory movement of the piston, the head containing a fresh air inlet passage and an inlet valve movable for controlling the flow into the cylinder, a combustion chamber defined by a cavity in the head, a connecting channel connecting the chamber to the area between the piston and head, a cold start valve at the channel end of the chamber for closing the channel at times permitting a pressure buildup in the displacement volume area to enhance the rapid flow of fresh air into the chamber upon opening of the chamber valve, the chamber containing a fuel injection means and a spark ignition means, the ignition means being positioned near the exit of the chamber adjacent to the connecting channel and angled to propagate the flame away from the latter channel to completely burn the air/fuel mixture within the chamber subsequent to opening of the chamber valve, the fresh air remaining in the swept volume area oxidizing the burned gases emanating from the chamber during the engine expansion stroke to reduce exhaust emissions.

9. A method of operating a spark ignition type engine having a cylinder with a piston reciprocably mounted therein, a cylinder head overlying and closing the cylinder to define a main chamber swept volume/clearance volume area therebetween, a fresh air inlet valve in the head for admitting or blocking the flow of air into the swept volume area, and an exhaust valve in the head for exhausting the products of combustion from the area, comprising the steps of:

locating a combustion chamber solely in the head with a channel of small cross-sectional area connecting the latter chamber to the cylinder main swept volume area;

admitting fresh air to the swept volume area during the intake stroke of the piston for passage of the air into the combustion chamber with high velocity during the compression stroke of the piston;

injecting fuel into the combustion chamber for mixing with the air in a swirling manner; and igniting the air/fuel mixture within the chamber in a manner providing complete combustion solely within the chamber thereby eliminating the discharge of unburned fuel therefrom.

10. A method as in claim 9, including providing a movable valve in the exit of the combustion chamber to the connecting channel closable during engine cold start operation until the attainment of a predetermined pressure in the cylinder swept area higher than the pressure in the combustion chamber sufficient to effect a high velocity movement of the cylinder air into the latter chamber upon opening of the movable valve to effect evaporation of the fuel and mixing with the air sufficient to provide complete combustion in the combustion chamber.

11. A method as in claim 10, including maintaining the combustion chamber valve closed until the ratio between the pressures of the cylinder swept volume area and the combustion chamber establishes sonic air flow through the connecting channel upon opening of the movable valve.

12. A method as in claim 10, including making the minimum pressure ratio at two.

* * * * *